US007617870B1

(12) United States Patent
Roddy et al.

(10) Patent No.: US 7,617,870 B1
(45) Date of Patent: Nov. 17, 2009

(54) EXTENDED CEMENT COMPOSITIONS COMPRISING OIL-SWELLABLE PARTICLES AND ASSOCIATED METHODS

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/152,327

(22) Filed: May 14, 2008

(51) Int. Cl.
*E21B 33/13* (2006.01)
(52) U.S. Cl. .................................... 166/292; 166/285
(58) Field of Classification Search .................. None
See application file for complete search history.

(56) References Cited

U.S. PATENT DOCUMENTS

| | | | |
|---|---|---|---|
| 2,890,169 A | 6/1959 | Prokop | |
| 3,381,169 A | 4/1968 | Brock et al. | |
| 3,959,003 A | 5/1976 | Ostroot et al. | |
| 4,036,301 A * | 7/1977 | Powers et al. | 166/293 |
| 4,515,216 A | 5/1985 | Childs et al. | |
| 4,524,828 A | 6/1985 | Sabins et al. | |
| 4,633,950 A | 1/1987 | Delhommer et al. | |
| 4,676,832 A * | 6/1987 | Childs et al. | 106/730 |
| 4,941,536 A | 7/1990 | Brothers et al. | |
| 4,953,620 A | 9/1990 | Bloys et al. | |
| 5,049,288 A | 9/1991 | Brothers et al. | |
| 5,447,197 A | 9/1995 | Rae et al. | |
| 5,456,750 A | 10/1995 | Zandi et al. | |
| 5,472,051 A | 12/1995 | Brothers | |
| 5,536,311 A | 7/1996 | Rodrigues | |
| 5,547,506 A | 8/1996 | Rae et al. | |
| 5,575,841 A | 11/1996 | Dry | |
| 5,660,624 A | 8/1997 | Dry | |
| 5,663,230 A | 9/1997 | Haman | |
| 5,688,844 A * | 11/1997 | Chatterji et al. | 524/8 |
| 5,779,787 A | 7/1998 | Brothers et al. | |
| 5,897,699 A | 4/1999 | Chatterji et al. | |
| 5,989,334 A | 11/1999 | Dry | |
| 6,173,778 B1 | 1/2001 | Rae et al. | |
| 6,261,360 B1 | 7/2001 | Dry | |
| 6,457,523 B1 | 10/2002 | Vijn et al. | |
| 6,502,636 B2 | 1/2003 | Chatterji et al. | |
| 6,508,305 B1 | 1/2003 | Brannon et al. | |
| 6,524,828 B1 | 2/2003 | Liao et al. | |
| 6,527,849 B2 | 3/2003 | Dry | |
| 6,610,140 B2 | 8/2003 | Vijn et al. | |
| 6,616,142 B2 | 9/2003 | D'Almeida et al. | |
| 6,626,242 B2 | 9/2003 | D'Almeida et al. | |
| 6,631,766 B2 | 10/2003 | Brothers et al. | |
| 6,645,288 B1 | 11/2003 | Dargaud et al. | |
| 6,767,398 B2 | 7/2004 | Trato | |
| 6,811,603 B2 | 11/2004 | Brothers et al. | |
| 6,832,651 B2 | 12/2004 | Ravi et al. | |
| 6,902,001 B2 | 6/2005 | Dargaud et al. | |
| 6,907,928 B2 | 6/2005 | Di Lullo Arias et al. | |
| 6,907,929 B2 | 6/2005 | Leroy-Delage et al. | |
| 6,926,081 B2 | 8/2005 | Sweatman et al. | |
| 6,962,201 B2 | 11/2005 | Brothers | |
| 7,007,755 B2 | 3/2006 | Reddy et al. | |
| 7,022,179 B1 | 4/2006 | Dry | |
| 7,026,272 B2 | 4/2006 | Reddy et al. | |
| 7,059,415 B2 | 6/2006 | Bosma et al. | |
| 7,138,446 B2 | 11/2006 | Reddy et al. | |
| 7,143,828 B2 | 12/2006 | Reddy et al. | |
| 7,143,832 B2 | 12/2006 | Freyer | |
| 7,156,173 B2 | 1/2007 | Mueller | |
| 7,172,022 B2 | 2/2007 | Reddy et al. | |
| 7,264,053 B2 | 9/2007 | Vargo, Jr. et al. | |
| 7,284,611 B2 | 10/2007 | Reddy et al. | |
| 7,294,194 B2 | 11/2007 | Reddy et al. | |

(Continued)

FOREIGN PATENT DOCUMENTS

| | | |
|---|---|---|
| GB | 2429725 A | 3/2007 |
| WO | 03/008756 A1 | 1/2003 |
| WO | 2004/057715 A1 | 7/2004 |
| WO | 2004/101951 A1 | 11/2004 |
| WO | 2004/101952 A1 | 11/2004 |
| WO | WO 2004101951 | 11/2004 |
| WO | 2006/053896 A1 | 11/2005 |

OTHER PUBLICATIONS

API Specification for Materials and Testing for Well Cements, API Specification 10, Fifth ed., pp. 7, 19-21, Jul. 1991.
Bosma, et al., "Design Approach to Sealant Selection for the Life of the Well," Society of Petroleum Engineers, SPE 56536, pp. 1-14, 1999.
Halliburton brochure entitled "HR® —7 Cement Retarder", 1999.
Halliburton brochure entitled "HR® —25 Cement Retarder", 1999.

(Continued)

*Primary Examiner*—Jennifer H Gay
*Assistant Examiner*—Angela M DiTrani
(74) *Attorney, Agent, or Firm*—Craig W. Roddy; Tumey, LLP

(57) ABSTRACT

A variety of methods and compositions are disclosed herein, including, in one embodiment, a method of cementing in a subterranean formation comprising: providing an extended cement composition comprising cement, water, an oil-swellable particle, and a set retarding additive, wherein the extended cement composition is capable of remaining in a pumpable fluid state for at least about 1 day; adding a cement set accelerator to the extended cement composition; introducing the extended cement composition into a well bore; and allowing the extended cement composition to set. Another embodiment comprises an extended cement composition comprising: cement; water; an oil-swellable particle; and a set retarding additive, wherein the extended cement composition is capable of remaining in a pumpable fluid state for at least about 1 day.

28 Claims, No Drawings

U.S. PATENT DOCUMENTS

| | | | |
|---|---|---|---|
| 7,296,597 | B1 | 11/2007 | Freyer et al. |
| 7,303,014 | B2 | 12/2007 | Reddy et al. |
| 7,337,841 | B2 | 3/2008 | Ravi |
| 7,351,279 | B2 | 4/2008 | Brothers |
| 7,404,440 | B2 | 7/2008 | Reddy et al. |
| 7,409,991 | B2 | 8/2008 | Reddy et al. |
| 7,422,060 | B2 | 9/2008 | Hammami |
| 7,451,817 | B2 | 11/2008 | Reddy et al. |
| 7,482,309 | B2 | 1/2009 | Ravi et al. |
| 7,530,396 | B1 | 5/2009 | Reddy et al. |
| 2003/0006038 | A1 | 1/2003 | Reddy et al. |
| 2004/0055748 | A1 | 3/2004 | Reddy et al. |
| 2004/0144537 | A1 | 7/2004 | Reddy et al. |
| 2004/0171499 | A1 | 9/2004 | Ravi et al. |
| 2004/0261990 | A1 | 12/2004 | Bosma et al. |
| 2005/0056057 | A1 | 3/2005 | Bosma et al. |
| 2005/0061206 | A1 | 3/2005 | Reddy et al. |
| 2005/0109507 | A1* | 5/2005 | Heathman et al. ........... 166/292 |
| 2005/0113260 | A1 | 5/2005 | Wood |
| 2005/0113262 | A1 | 5/2005 | Ravi et al. |
| 2005/0199401 | A1 | 9/2005 | Patel et al. |
| 2006/0086503 | A1* | 4/2006 | Reddy et al. ................ 166/293 |
| 2006/0122071 | A1 | 6/2006 | Reddy et al. |
| 2007/0012436 | A1 | 1/2007 | Freyer |
| 2007/0017676 | A1 | 1/2007 | Reddy et al. |
| 2007/0062691 | A1 | 3/2007 | Reddy et al. |
| 2007/0137528 | A1* | 6/2007 | Le Roy-Delage et al. ... 106/718 |
| 2007/0142547 | A1* | 6/2007 | Vaidya et al. ............... 524/847 |
| 2007/0151484 | A1 | 7/2007 | Reddy et al. |
| 2007/0151724 | A1 | 7/2007 | Ohmer et al. |
| 2007/0151730 | A1 | 7/2007 | Reddy et al. |
| 2007/0204765 | A1 | 9/2007 | Le Roy-Delage et al. |
| 2007/0227734 | A1 | 10/2007 | Freyer |
| 2007/0246225 | A1 | 10/2007 | Hailey, Jr. et al. |
| 2008/0099203 | A1* | 5/2008 | Mueller et al. .............. 166/293 |
| 2008/0108524 | A1 | 5/2008 | Willberg et al. |
| 2008/0135250 | A1* | 6/2008 | Bosma et al. ............... 166/285 |
| 2008/0156491 | A1 | 7/2008 | Roddy et al. |
| 2008/0261027 | A1 | 10/2008 | Li et al. |
| 2008/0261834 | A1 | 10/2008 | Simon |
| 2009/0071650 | A1 | 3/2009 | Roddy et al. |
| 2009/0124522 | A1 | 5/2009 | Roddy |

OTHER PUBLICATIONS

Kleverlaan, et al., "Deployment of Swelling Elastomer Packers in Shell E&P," Society of Petroleum Engineers, SPE/IADC 92346, pp. 1-5, 2005.

Kennedy, et al., "The Use of Swell Packers as a Replacement and Alternative to Cementing," Society of Petroleum Engineers, SPE 95713, pp. 1-4, 2005.

Laws, et al., "PDOB's Proactive Approach to Solving Zonal Isolation Challenge in Harweel HP Wells Using Swell Packers," Society of Petroleum Engineers, IADC/SPE 100361, pp. 1-7, 2006.

Schlumberger brochure entitled "Futur Slurry Systems", 2007.

Cavanagh, et al., "Self-Healing Cement-Novel Technology to Achieve Leak-Free Wells," Society of Petroleum Engineers, SPE/IADC 105781, pp. 1-3 , Feb. 2007.

Antonio et al., "Swelling Packer Technology Eliminates Problems in Difficult Zonal Isolation in Tight-Gas Reservoir Completion," Society of Petroleum Engineers, SPE 107578, pp. 1-4, Apr. 2007.

Halliburton brochure entitled "Econolite™ Additive", Aug. 2007.

Halliburton brochure entitled "SCR-100™ Cement Retarder", Aug. 2007.

Halliburton brochure entitled "HR® —4 Cement Retarder", Aug. 2007.

Halliburton brochure entitled "HR® —5 Cement Additives", Aug. 2007.

Halliburton brochure entitled "HR® —7 Cement Retarder", Aug. 2007.

Keshka, et al., "Practical Uses of Swellable Packer Technology to Reduce Water Cut: Case Studies From the Middle East and Other Areas," Society of Petroleum Engineers, SPE 108613, pp. 1-10, Sep. 2007.

Halliburton brochure entitled "Cement Assurance™ MC Tool", Oct. 2007.

Halliburton brochure entitled "Cement Assurance™ MA Tool", Oct. 2007.

Halliburton brochure entitled "Cement Assurance™ HE Tool", Oct. 2007.

Halliburton brochure entitled "Well Life III Cementing Service", Apr. 2008.

Ravi, et al, "Interventionless Zonal Isolation," E&P, pp. 93-94, May 2008.

"Water-Swellabe Polymer Networks—From Hydrogels to Superabsorbers," available at http://www. sigmaaldrich.com/aldrich/technical%20ads/al_ms_ad46_water_polymers.pdf, Printed from Internet on May 22, 2008.

Notice of Allowance dated Jun. 30, 2008 from U.S. Appl. No. 11/223,669.

U.S. Appl. No. 12/268,800, Roddy et al.

U.S. Appl. No. 12/283,398, Roddy et al.

U.S. Appl. No. 12/364,998, Craig W. Roddy.

U.S. Appl. No. 11/937,661, Kulakofsky et al.

Moroni et al., "Overcoming the Weak Link in Cement Hydraulic Isolation," Society of Petroleum Engineers, SPE 110523, 2007.

Roth et al., "Innovative Hydraulic Isolation Material Preserves Well Integrity," Society of Petroleum Engineers, IADC/SPE 112715, 2008.

Bouras et al., "Responsive Cementing Material Prevents Annular Leaks in Gas Wells," Society of Petroleum Engineers, SPE 116757, 2008.

Moroni et al., "Zonal Isolation in Reservoir Containing CO2 and H2S," Society of Petroleum Engineers, IADS/SPE 112703, 2008.

Ravi et al., "Maximizing Heavy-Oil Recovery by Containing Steam through Optimized Cementing," Society of Petroleum Engineers, SPE 117516, 2008.

Ravi et al., "Interventionless Zonal Isolation," E&P, May 2008.

Hunter et al., "Life-of-Well Isolation Takes Intelligence," E&P, Sep. 2007.

Schlumberger brochure entitled "FUTURE: Active Set-Cement Technology for Long-Term Zonal Isolation," 2007.

"Waterstop-RX Bentonite Waterstop," Master Guideline Specification for Cast-in-Place Concrete, Section 032500, Jan. 2006.

Chang et al.,"Material Properties of Portland Cement Paste with Nano-Montmorillonite," J. Material Science, May 18, 2007.

Material Safety Data Sheet: CALPRENE 411/411C, pp. 1-6 (Jun. 1, 2007).

Dynasol, Calprene 411, p. 1 (Dec. 2007).

Wikipedia, Styrene-Butadiene, pp. 1-2, at http://en.wikipedia.org/wiki/Styrene-butadiene (Printed from the Internet on Mar. 3, 2009).

Office Action from U.S. Appl. No. 12/263,800 dated May 1, 2009.

USPTO Office Action for U.S. Appl. No. 12/283,398 dated Jul. 15, 2009.

USPTO Office Action for U.S. Appl. No. 12/263,800 dated Jul. 28, 2009.

Foreign communication for related counterpart application dated Jul. 22, 2009.

International Search Report for related counterpart application dated Jul. 22, 2009.

\* cited by examiner

EXTENDED CEMENT COMPOSITIONS COMPRISING OIL-SWELLABLE PARTICLES AND ASSOCIATED METHODS

BACKGROUND

The present invention relates to cementing operations and, more particularly, to extended cement compositions comprising cement, water, oil-swellable particles, and a set retarding additive and associated methods of use.

Cement compositions are commonly utilized in subterranean operations, particularly subterranean well construction and remedial operations. For example, in subterranean well construction, a pipe string (e.g., casing, liners, etc.) may be introduced into the well and cemented in place. The process of cementing the pipe string in place is commonly referred to as "primary cementing." In a typical primary cementing operation, a cement composition may be pumped into an annulus between the walls of a well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the walls of the well bore. Among other things, the annular sheath of set cement surrounding the pipe string functions to prevent the migration of fluids in the annulus, as well as protecting the pipe string from corrosion. Cement compositions also may be used in remedial cementing operations, such as squeeze cementing and the placement of cement plugs.

Once set, the cement sheath may be subjected to a variety of cyclic, shear, tensile, impact, flexural, and/or compressive stresses that may lead to failure of the cement sheath. Such failure may be the result of fractures, cracks, and/or debonding of the cement sheath from the pipe string and/or the formation. Undesirably, cement-sheath failure may lead to loss of zonal isolation, resulting, for example, in the undesirable migration of fluids between formation zones. This may lead to undesirable consequences such as lost production, costly remedial operations, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

In certain applications, extended cement compositions may be used. As used herein, the term "extended cement composition" refers to a cement composition capable of remaining in a pumpable fluid state for an extended period of time (e.g., at least about 1 day). A fluid is considered to be in a pumpable fluid state where the fluid has a viscosity of less than 70 Bc, as measured using an FANN Atmospheric Consistometer Model 165AT (available from FANN Instrument Company, Houston, Tex.) at room temperature (for example, 78° F.). In general, the extended cement compositions comprise cement, water, and a set retarder and remain in a pumpable fluid state for an extended period of time. When desired for use, the extended cement composition should be capable of being activated whereby reasonable compressive strengths are developed. For example, a cement set accelerator may be added to the extended cement composition whereby the composition sets into a hardened mass. Among other things, the extended cement compositions may be suitable for use in well bore applications, for example, where it is desired to prepare the cement composition in advance. This may allow, for example, the cement composition to be stored prior to its use. In addition, this may allow, for example, the cement composition to be prepared at a convenient location and then transported to the job site for use. Accordingly, capital expenditures associated with the cementing operations may be reduced due to a reduction in the need for on-site bulk storage and mixing equipment.

SUMMARY

The present invention relates to cementing operations and, more particularly, to extended cement compositions comprising cement, water, oil-swellable particles, and a set retarding additive and associated methods of use.

One embodiment of the present invention comprises a method of cementing in a subterranean formation comprising: providing an extended cement composition comprising cement, water, an oil-swellable particle, and a set retarding additive, wherein the extended cement composition is capable of remaining in a pumpable fluid state for at least about 1 day; adding a cement set accelerator to the extended cement composition; introducing the extended cement composition into a well bore; and allowing the extended cement composition to set.

Another embodiment of the present invention comprises a method of cementing in a subterranean formation comprising: providing an extended cement composition comprising hydraulic cement, water, an oil-swellable particle, and a set retarding additive; storing the extended cement composition; adding a cement set accelerator to the extended cement composition; introducing the extended cement composition into a well bore; and allowing the extended cement composition to set.

Another embodiment of the present invention comprises an extended cement composition comprising: cement; water; an oil-swellable particle; and a set retarding additive, wherein the extended cement composition is capable of remaining in a pumpable fluid state for at least about 1 day.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to extended cement compositions comprising cement, water, oil-swellable particles, and a set retarding additive and associated methods of use.

In certain embodiments, the present invention provides extended cement compositions that are capable of remaining in a pumpable fluid state for an extended period of time. For example, the extended cement compositions may be capable of remaining in a pumpable fluid state for at least about 1 day or longer (e.g., at least about 1 day, 2 days, 3 days, 4 days, 5 days, or the like). When desired for use, the extended cement composition may be activated (e.g., by addition of a cement set accelerator) to thereby set into a hardened mass. By way of example, the extended cement composition, after activation, may set to a compressive strength (as determined using the procedure set forth in API Specification 10) at 140° F. of at least about 100 psi in 72 hours, alternatively at least about 500 psi. Among other things, the extended cement compositions of the present invention may be suitable for use in well bore applications, for example, where it is desired to prepare the cement composition in advance. By way of example, the extended cement compositions may facilitate preparation of the cement composition at a convenient location and then transport to the job site for use in the cementing operation.

An example of a suitable extended cement composition of the present invention comprises cement, water, an oil-swellable particle, and a set retarding additive. Optionally, a suspending agent may be included in the extended cement composition as desired. The extended cement compositions of the present invention should have a density suitable for a particular application as desired by those of ordinary skill in the art, with the benefit of this disclosure. In some embodiments, the extended cement compositions of the present invention may have a density in the range of about 8 pounds per gallon ("lb/gal") to about 16 lb/gal.

Embodiments of the extended cement compositions of the present invention generally comprise a cement. In certain embodiments, the cement comprises hydraulic cement. A variety of hydraulic cements may be utilized in accordance with embodiments of the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

The water used in embodiments of the extended cement compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the settable composition. In some embodiments, the water may be included in an amount sufficient to form a pumpable slurry. In some embodiments, the water may be included in the extended cement compositions of the present invention in an amount in the range of about 40% to about 200% by weight of the cement ("bwoc") (e.g., about 50%, about 60%, about 70%, about 80%, about 90%, about 100%, about 110%, about 120%, about 130%, about 140%, about 150%, about 160%, about 170%, about 180%, about 190%, etc.). In some embodiments, the water may be included in an amount in the range of about 40% to about 150% bwoc.

As set forth above, embodiments of the extended cement compositions may comprise an oil-swellable particle. As used herein, a particle is characterized as oil swellable when it swells upon contact with oil. In accordance with embodiments of the present invention, the oil-swellable particle may be included in the extended cement composition, for example, to counteract the formation of cracks in the cement sheath and/or micro-annulus between the cement sheath and the pipe string or the formation. In general, the oil-swellable particle should be capable of swelling when contacted by oil to inhibit fluid flow through the crack and/or micro-annulus. Accordingly, the oil-swellable particle may prevent and/or reduce the loss of zonal isolation in spite of the formation of cracks and/or micro-annulus, potentially resulting in an improved annular seal for the extended cement compositions.

An example of an oil-swellable particle that may be utilized in embodiments of the present invention comprises an oil-swellable elastomer. Oil-swellable elastomers suitable for use in embodiments of the present invention may generally swell by up to about 500% of their original size at the surface when contacted by oil. Under downhole conditions, this swelling may be more, or less, depending on the conditions presented. For example, the swelling may be at least 10% at downhole conditions. In some embodiments, the swelling may be up to about 200% under downhole conditions. However, as those of ordinary skill in the art, with the benefit of this disclosure, will appreciate, the actual swelling when the swellable elastomer is included in a cement composition may depend on, for example, the concentration of the swellable elastomer included in the cement composition, downhole pressure, and downhole temperature, among other factors. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), styrene butadiene block copolymer rubber, sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), alkylstyrene, and crosslinked substituted vinyl acrylate copolymers. Combinations of suitable oil-swellable elastomers may also be utilized. One example of a suitable swellable elastomer comprises a block copolymer of a styrene butadiene rubber. Other swellable elastomers that behave in a similar fashion with respect to oil also may be suitable. Those of ordinary skill in the art, with the benefit of this disclosure, will be able to select an appropriate swellable elastomer for use in the compositions of the present invention based on a variety of factors, including the application in which the composition will be used and the desired swellable characteristics.

Where used, the oil-swellable particle generally may be included in the cement compositions in an amount sufficient to provide the desired mechanical properties. In some embodiments, the swellable particle may be present in the cement compositions in an amount up to about 27% bwoc (e.g., about 1%, about 5%, about 10%, about 15%, about 20%, about 25%, etc.), alternatively in a range of about 1% to about 25% bwoc, and alternatively in a range of about 4% to about 20% bwoc.

In addition, the swellable particle that is utilized may have a wide variety of shapes and sizes of individual particles suitable for use in accordance with embodiments of the present invention. By way of example, the swellable particle may have a well-defined physical shape as well as an irregular geometry, including the physical shape of platelets, shavings, fibers, flakes, ribbons, rods, strips, spheroids, beads, toroids, pellets, tablets, or any other physical shape. In some embodiments, the swellable particle may have a particle size in the range of about 5 microns to about 1,500 microns. In some embodiments, the swellable particle may have a particle size in the range of about 20 microns to about 500 microns. However, particle sizes outside these defined ranges also may be suitable for particular applications.

Embodiments of the extended cement compositions of the present invention generally comprise a set retarding additive. Examples of suitable set retarding additives include, but are not limited to, organic acids, lignosulfonates, synthetic retarders and combinations thereof. Examples of organic acids that may be included in the extended cement compositions of the present invention include, but are not limited to, tartaric acid, gluconic acid, carboxylic acids (e.g., citric acid), hydroxy carboxy acids, and combinations thereof. One example of a suitable set retarding additive is tartaric acid, available from Halliburton Energy Services under the trade name HR®-25 cement retarder. Examples of lignosulfonates that may be included in the extended cement compositions of the present invention include, but are not limited to, a sulfomethylated lignin, calcium lignosulfonates, sodium lignosulfonates, and combinations thereof. Examples of suitable lignosulfonates include HR®-4, HR®-5, and HR®-7 cement retarders available from Halliburton Energy Services, Inc. Examples of synthetic retarders that may be included in the extended cement compositions of the present invention include, but are not limited to, copolymers of acrylic acid and 2-acrylamido-2-methyl-propane sulfonic acid (or salts thereof) polymer and copolymers of maleic anhydride and 2-acrylamido-2-methyl-propane sulfonic acid (or salts thereof) polymer. Examples of suitable synthetic retarders include SCR™-100 and SCR™-500 cement retarders available from Halliburton Energy Services, Inc. Examples of suitable synthetic retarders are described in U.S. Pat. Nos. 4,941,536, 5,049,288, 5,472,051, and 5,536,311, the disclosures of which are incorporated herein by reference.

The set retarding additive should be included in the extended cement compositions of the present invention in an amount sufficient for the settable composition to remain in a pumpable fluid state for an extended period of time (e.g., at least about 1 day). In certain embodiments, the set retarding additive may be included in the extended cement composition in an amount in the range of about 0.1% to about 5% bwoc (e.g., about 0.5%, about 1%, about 2%, about 3%, about 4%, etc.). In certain embodiments, the set retarding additive may be included in the extended cement composition in an amount in the range of about 0.1% to about 1.5% bwoc. Those of ordinary skill in the art, with the benefit of this disclosure, should be able to determine an appropriate set retarding additive and amount thereof for a particular application.

As previously mentioned, at a desired time for use, the extended cement composition may be activated, for example, by addition of a cement set accelerator. Examples of suitable cement set accelerators include, but are not limited to, calcium chloride, triethanolamine, sodium silicate, zinc formate, calcium acetate, and combinations thereof. An example of a suitable sodium silicate is ECONOLITE™ additive, available from Halliburton Energy Services, Inc. The cement set accelerator should be added to the extended cement composition in an amount sufficient to activate the extended cement composition to set into a hardened mass. In certain embodiments, the cement set accelerator may be added to the extended cement composition in an amount in the range of about 0.1% to about 4% by weight (e.g., about 0.5%, about 1%, about 2%, about 3%, etc.).

Other additional additives also may be added to the extended cement compositions of the present invention as deemed appropriate by one skilled in the art, with the benefit of this disclosure. Examples of such additives include, but are not limited to, weight reducing additives, heavyweight additives, lost circulation materials, filtration control additives, dispersants, suspending agents, and combinations thereof. Suitable examples of these additives include crystalline silica compounds, amorphous silica, salts, fibers, hydratable clays, microspheres, pozzolan additives, latex cement, thixotropic additives, combinations thereof and the like.

The extended cement compositions of the present invention may be used in a variety of subterranean applications, including, but not limited to, primary and remedial cementing. An example of a method of the present invention may comprise providing an extended cement composition comprising cement, water, a swellable particle, and a set retarding additive, wherein the extended cement composition is capable of remaining in a pumpable fluid state for at least about 1 day. The method further may comprise adding a cement accelerator to the extended cement composition. And the method further may comprise introducing the extended cement composition into a well bore, and allowing the extended cement composition to set.

Another example of a method of the present invention may comprise providing an extended cement composition comprising cement, water, a swellable particle, and a set retarding additive. The method further may comprise storing the extended cement composition. The method further may comprise adding a cement set accelerator to the extended cement composition. And the method further may comprise introducing the extended cement composition into a well bore, and allowing the extended cement composition to set.

Another example of a method of the present invention is a method of cementing a pipe string (e.g., casing, expandable casing, liners, etc.) disposed in a well bore. The method may comprise providing an extended cement composition comprising cement, water, a swellable particle, and a set retarding additive, wherein the extended cement composition is capable of remaining in a pumpable fluid state for at least about 1 day. The method further may comprise adding a cement accelerator to the extended cement composition. And the method further may comprise introducing the extended cement composition into an annulus between the pipe string and the subterranean formation surrounding the well bore, and allowing the extended cement composition to set. In certain embodiments, the method further may comprise introducing the pipe string into the well bore.

To facilitate a better understanding of the present invention, the following examples of certain aspects of some embodiments are given. In no way should the following examples be read to limit, or define, the scope of the invention.

EXAMPLE 1

To test the capability of a cement composition comprising oil-swellable particles to remain in a pumpable liquid state for an extended period of time, a sample extended cement composition was prepared. The sample composition had a density of 14 lb/gal and comprised Class H Texas Lehigh cement, water in an amount of 52.4% bwoc, block copolymer of styrene-butadiene elastomeric particles in an amount of 20% bwoc, and HR®5 cement retarder in an amount of 1% bwoc.

After preparation, the sample extended cement composition was placed in a sealed plastic container at room temperature (e.g., about 78° F.). The sample composition was observed on a daily basis for flowability over 10 days. Observing the composition for flowability involved shaking the plastic container and observing whether the composition was flowable. For purposes of this example, the composition was considered to be in a fluid state based on visual observations, wherein the fluid was flowable when the plastic container was shaken. After 10 days, the sample extended cement composition remained flowable.

To determine the capability of this sample extended cement composition to thereafter set into a hardened mass, calcium chloride in an amount of 4% bwoc was added to the sample extended cement composition. The thickening time of the sample composition was then determined, in accordance with the above-referenced API Specification 10. After addition of the calcium slurry, the sample composition reached 70 Bc after 6 hours.

EXAMPLE 2

This example was performed to determine the capability of the swellable particles in the sample extended cement composition of Example 1 to swell when contacted by oil. Accordingly, a sample extended cement composition was prepared that had a density of 14 lb/gal and comprised Class H Texas Lehigh cement, water in an amount of 52.4% bwoc, block copolymer of styrene-butadiene elastomeric particles in an amount of 20% bwoc, HR®5 cement retarder in an amount of 1% bwoc, and calcium chloride in an amount of 4% bwoc.

The sample extended cement composition was formed into 3 cubes and cured at 140° F. After 24 hours, the set cubes were weighed. The cubes were then immersed in a mineral oil bath at 180° F. Every 24 hours after immersion in the mineral oil bath, the set cubes were removed from the mineral oil bath, dried, and weighed. The experiment was discontinued at the end of a 4-day period. Based on the weights of the cubes, the average amount of expansion was found to be 6.13%. It is believed that increased cube weight was due to swelling of the elastomeric particles from contact with the mineral oil. The expansion data for the cubes is set forth in the table below.

TABLE 1

Class H Texas Lehigh, 1% HR ®5 Cement Retarder, 4% CaCl$_2$, 52.4% Water, and 20% Elastomeric Particles

| Sample Weight | Elastomeric Particles[1] (% bwoc) | Time in 1800° F. Oil Bath | Cube 1 Weight (g) | Cube 2 Weight (g) | Cube 3 Weight (g) |
|---|---|---|---|---|---|
| 14 lb/gal | 20 | 0 days | 211.28 | 214.76 | 211.86 |
| 14 lb/gal | 20 | 1 day | 218.23 | 219.98 | 218.16 |
| 14 lb/gal | 20 | 2 days | 221.93 | 220.45 | 220.25 |
| 14 lb/gal | 20 | 3 days | 226.08 | 222.86 | 223.62 |
| 14 lb/gal | 20 | 4 days | 224.78 | 223.90 | 228.24 |
| | % Expanded | | 6.39% | 4.26% | 7.73% |
| | % Average Expanded | | | 6.13% | |

[1]The elastomeric particles included in the sample comprised copolymers of styrene-butadiene elastomeric particles.

EXAMPLE 3

This example was similar to Example 2 except the oil-swellable particles were included in the sample extended cement composition in an amount of 27% bwoc. Accordingly, a sample extended cement composition was prepared that had a density of 13.5 lb/gal and comprised Class H Texas Lehigh cement, water in an amount of 56.5% bwoc, block copolymer of styrene-butadiene elastomeric particles in an amount of 27% bwoc, HR®5 cement retarder in an amount of 1% bwoc, and calcium chloride in an amount of 4% bwoc.

This sample extended cement composition was formed into 3 cubes and cured at 140° F. After 24 hours, the set cubes were weighed. The cubes were then immersed in a mineral oil bath at 180° F. Every 24 hours after immersion in the mineral oil bath, the set cubes were removed from the mineral oil bath, dried, and weighed. The experiment was discontinued at the end of a 4-day period. Based on the weights of the cubes, the average amount of expansion was found to be 6.13%. It is believed that the increased cube weight was due to swelling of the elastomeric particles due to contact with the mineral oil. The expansion data for the cubes is set forth in the table below.

TABLE 2

Class H Texas Lehigh, 1% HR ®5 Cement Retarder, 4% CaCl$_2$, 56.5% Water, and 27% Elastomeric Particles

| Sample Weight | Elastomeric Particles[1] (% bwoc) | Time in 1800° F. Oil Bath | Cube 1 Weight (g) | Cube 2 Weight (g) | Cube 3 Weight (g) |
|---|---|---|---|---|---|
| 13.5 lb/gal | 27 | 0 days | 209.80 | 208.60 | 209.26 |
| 13.5 lb/gal | 27 | 1 day | 229.66 | 235.67 | 234.59 |
| 13.5 lb/gal | 27 | 2 days | 232.59 | 234.34 | 240.87 |
| 13.5 lb/gal | 27 | 3 days | 232.21 | 234.76 | 239.15 |
| 13.5 lb/gal | 27 | 4 days | 233.29 | 233.15 | 240.51 |
| | % Expanded | | 11.19% | 11.76% | 14.93% |
| | % Average Expanded | | | 12.63% | |

[1]The elastomeric particles included in the sample comprised copolymers of styrene-butadiene elastomeric particles.

EXAMPLE 4

This example was performed to determine whether the expansion of the cubes observed in Examples 2 and 3 was due to swelling of the elastomeric particles or absorption of the oil by the cubes. Accordingly, a sample extended cement composition was prepared that had a density of 14 lb/gal and comprised Class H Texas Lehigh cement, water in an amount of 69.95% bwoc, HR®5 cement retarder in an amount of 1% bwoc, and calcium chloride in an amount of 4% bwoc. No oil-swellable elastomeric particles were included in this sample composition.

This sample extended cement composition was formed into 3 cubes and cured at 140° F. After 24 hours, the set cubes were weighed. The cubes were then immersed in a mineral oil bath at 180° F. At the end of 24 hours, 48 hours, and 120 hours, the set cubes were removed from the mineral oil bath, dried, and weighed. The experiment was discontinued at the end of a 4-day period. As illustrated in the table below, the cubes absorbed an insignificant amount of oil.

TABLE 3

Class H Texas Lehigh, 1% HR ®5 Cement Retarder, 4% CaCl$_2$, and 69.95% Water

| Sample Weight | Elastomeric Particles (% bwoc) | Time in 1800° F. Oil Bath | Cube 1 Weight (g) | Cube 2 Weight (g) |
|---|---|---|---|---|
| 14 lb/gal | None | 0 day | 217.83 | 232.04 |
| 14 lb/gal | None | 1 days | 217.25 | 231.43 |
| 14 lb/gal | None | 4 days | 217.24 | 231.21 |
| | % Expanded | | −0.27% | −0.35% |
| | % Average Expanded | | | −0.31% |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing in a subterranean formation comprising:
    providing an extended cement composition consisting essentially of:
        cement,
        water,
        an oil-swellable particle, and
        a set retarding additive,
        wherein the extended cement composition is unfoamed and capable of remaining at a viscosity of less than 70 Bc at room temperature for at least about 1 day;
    storing the extended cement composition for a period of time;
    adding a cement set accelerator to the extended cement composition;
    introducing the extended cement composition into the subterranean formation;
    allowing the extended cement composition to set in the subterranean formation; and
    allowing the oil-swellable particle in the set cement composition to contact oil whereby the oil-swellable particle swells to counteract either a crack that forms in the set cement composition or a micro-annulus between the set cement composition and either a pipe string or the subterranean formation.

2. The method of claim 1 wherein the extended cement composition is capable of remaining in a pumpable fluid state for at least about 5 days.

3. The method of claim 1 wherein the extended cement composition sets to have a 72-hour compressive strength at 140° F. of at least about 100 psi.

4. The method of claim 1 wherein the extended cement composition is introduced into a space between the subterranean formation surrounding the well bore and a pipe string disposed in the well bore.

5. The method of claim 4 comprising introducing the pipe string into the well bore.

6. The method of claim 1 wherein the cement comprises a hydraulic cement.

7. The method of claim 1 wherein the oil-swellable particle comprises an oil-swellable elastomer.

8. The method of claim 1 wherein the oil-swellable particle comprises a block copolymer of styrene butadiene.

9. The method of claim 1 wherein the oil-swellable particle is present in an amount of about 1% to about 25% bwoc and the oil-swellable particle comprises a block copolymer of styrene butadiene.

10. The method of claim 1 wherein the oil-swellable particle is present in the extended cement composition in an amount up to about 27% by weight of the cement.

11. The method of claim 1 wherein the set retarding additive comprises at least one additive selected from the group consisting of an organic acid, a lignosulfonate, and a synthetic retarder.

12. The method of claim 1 wherein the cement set accelerator comprises at least one additive selected from the group consisting of calcium chloride, triethanolamine, sodium silicate, zinc formate, and calcium acetate.

13. The method of claim 1 wherein the oil-swellable particle comprises at least one elastomer selected from the group consisting of natural rubber, acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene copolymer rubber, styrene butadiene block copolymer rubber, sulphonated polyethylene, ethylene acrylate rubber, epichlorohydrin ethylene oxide copolymer, ethylene-propylene rubber, ethylene-propylene diene terpolymer rubber, ethylene vinyl acetate copolymer, fluorosilicone rubber, silicone rubber, poly 2,2,1-bicyclo heptene (polynorborneane), alkylstyrene, crosslinked substituted vinyl acrylate copolymer, and combinations thereof.

14. The method of claim 1 wherein the extended cement composition remains pumpable for at least about one day.

15. The method of claim 1 wherein the extended cement composition remains pumpable for at least about 5 days.

16. A method of cementing in a subterranean formation comprising:
    providing an extended cement composition consisting essentially of:
        hydraulic cement,
        water,
        an oil-swellable particle,
        a set retarding additive, and
        an additional additive comprising at least one additive selected from the group consisting of a weight reducing additive, a heavyweight additive, a lost circulation material, a filtration control additive, a dispersant, a suspending agent, a crystalline silica compound, amorphous silica, salt, fiber, a hydratable clay, a microsphere, a pozzolan additive, latex cement, a thixotropic additive, and combinations thereof,
        wherein the extended cement composition is unfoamed and capable of remaining at a viscosity of less than 70 Bc at room temperature for at least about 1 day;
    storing the extended cement composition for a period of time;
    adding a cement set accelerator to the extended cement composition;
    introducing the extended cement composition into the subterranean formation;
    allowing the extended cement composition to set in the subterranean formation; and
    allowing the oil-swellable particle in the set cement composition to contact oil whereby the oil-swellable particle swells to counteract either a crack that forms in the set cement composition or a micro-annulus between the set cement composition and either a pipe string or the subterranean formation.

17. The method of claim 16 wherein the extended cement composition sets to have a 72-hour compressive strength of at least about 100 psi in the well bore.

18. The method of claim 16 wherein the extended cement composition is introduced into a space between the subterranean formation surrounding the well bore and a pipe string disposed in the well bore.

19. The method of claim 16 wherein the oil-swellable particle comprises an oil-swellable elastomer.

20. The method of claim 16 wherein the oil-swellable particle comprises a block copolymer of styrene butadiene.

21. The method of claim 16 wherein the oil-swellable particle is present in an amount of about 1% to about 25% bwoc and the oil-swellable particle comprises a block copolymer of styrene butadiene.

22. The method of claim 16 wherein the oil-swellable particle is present in the extended cement composition in an amount up to about 27% by weight of the hydraulic cement.

23. The method of claim 16 wherein the oil-swellable particle comprises at least one elastomer selected from the group consisting of natural rubber, acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene copolymer rubber, styrene butadiene block copolymer rubber, sulphonated polyethylene, ethylene acrylate rubber, epichlorohydrin ethylene oxide copolymer, ethylene-propylene rubber, ethylene-propylene diene terpolymer rubber, ethylene vinyl acetate copolymer, fluorosilicone rubber, silicone rubber, poly 2,2,1-bicyclo heptene (polynorborneane), alkylstyrene, crosslinked substituted vinyl acrylate copolymer, and combinations thereof.

24. The method of claim 16 wherein the extended cement composition remains pumpable for at least about one day.

25. The method of claim 16 wherein extended cement composition remains pumpable for at least about 5 days.

26. A method of cementing in a subterranean formation comprising:
providing an extended cement composition comprising:
cement,
water,
an oil-swellable particle that comprises a block copolymer of styrene butadiene, and
a set retarding additive comprising at least one additive selected from the group consisting of an organic acid, a lignosulfonate, and a synthetic retarder,
wherein the extended cement composition is unfoamed and capable of remaining at a viscosity of less than 70 Bc at room temperature for at least about 1 day,
storing the extended cement composition for a period of time;
adding a cement set accelerator to the extended cement composition, wherein the cement set accelerator comprises at least one additive selected from the group consisting of calcium chloride, triethanolamine, sodium silicate, zinc formate, and calcium acetate;
introducing the extended cement composition into an annulus between a pipe string and the subterranean formation; and
allowing the extended cement composition to set in the annulus.

27. The method of claim 26 comprising:
allowing the oil-swellable particle in the set cement composition to contact oil whereby the oil-swellable particle swells to counteract either a crack that forms in the set cement or a micro-annulus between the set cement composition and either the pipe string or the subterranean formation.

28. The method of claim 26 wherein the extended cement composition remains pumpable for at least about 5 days.

* * * * *